United States Patent Office.

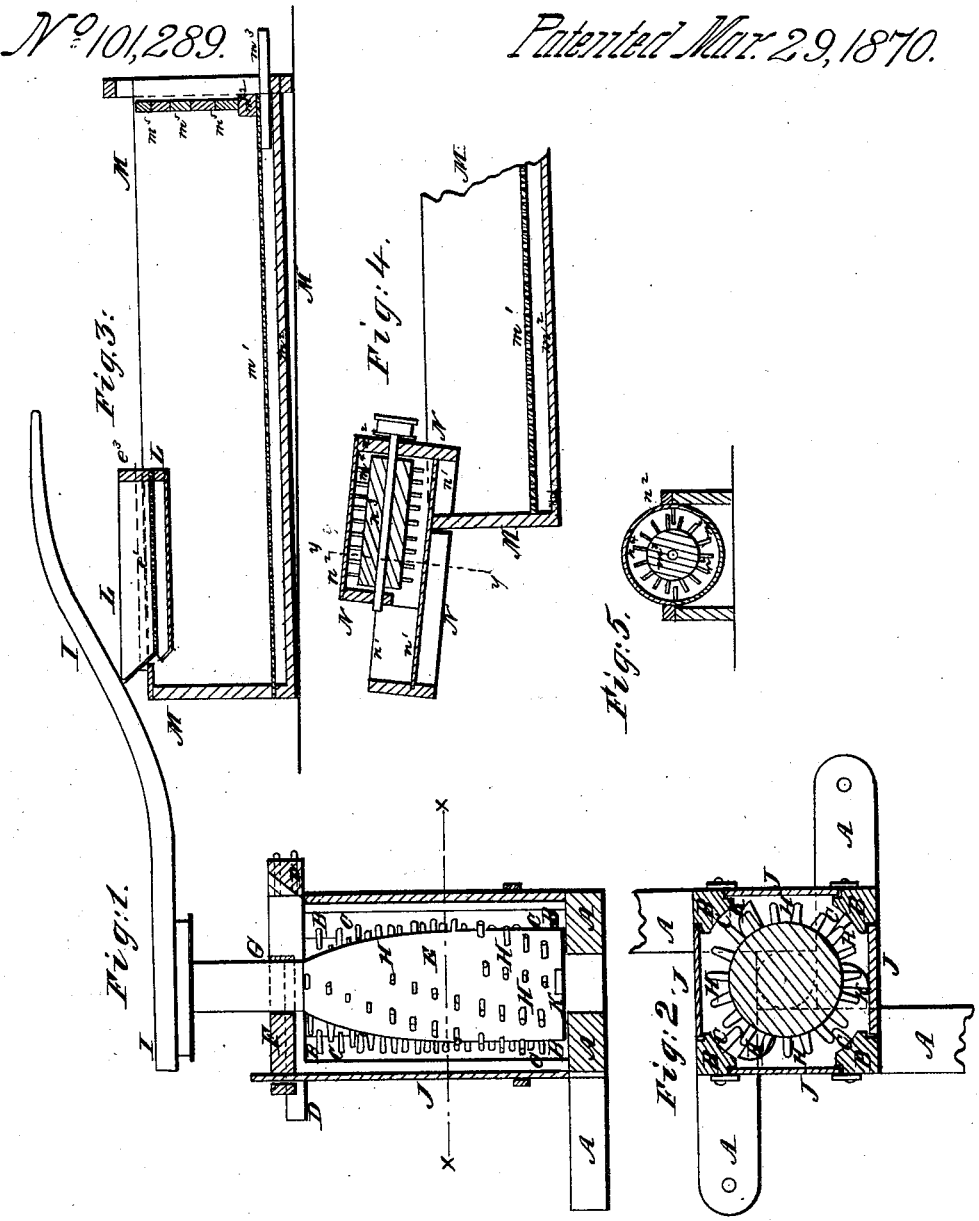

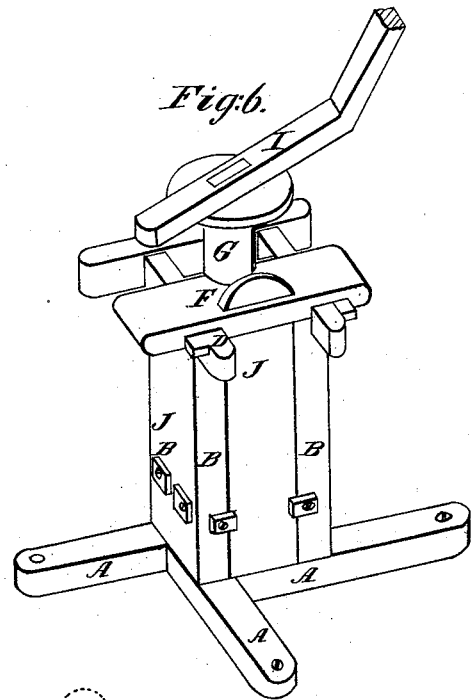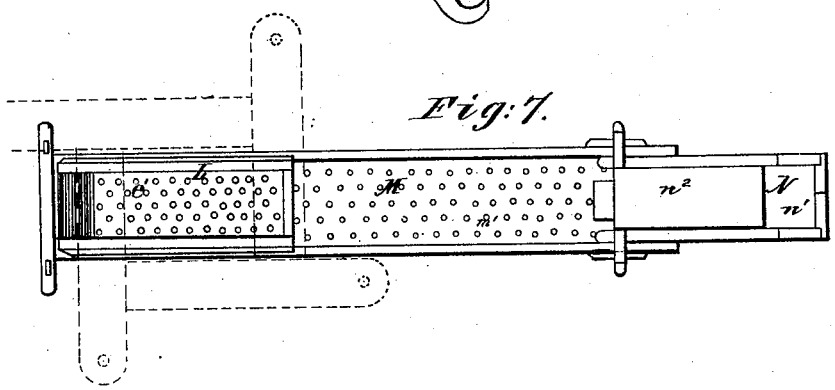

ROBERT H. MAYO, OF PARIS, TEXAS.

Letters Patent No. 101,289, dated March 29, 1870.

IMPROVEMENT IN APPARATUS FOR SEPARATING THE SEED FROM FRUIT-PULP.

The Schedule referred to in these Letters Patent and making part of the same.

*To all whom it may concern:*

Be it known that I, ROBERT H. MAYO, of Paris, in the county of Lamar and State of Texas, have invented a new and useful Improvement in Apparatus for Separating the Seed from Fruit-Pulp; and I do hereby declare that the following is a full, clear, and exact description thereof, which will enable others skilled in the art to make and use the same, reference being had to the accompanying drawings forming part of this specification, in which—

Figure 1 is a vertical section of the grinding-mill.

Figure 2 is a horizontal section of the same, taken through the line $x\,x$, fig. 1.

Figure 3 is a longitudinal section of the hand-riddle and trough, arranged for hand-washing.

Figure 4 is a longitudinal section of the power-riddle and trough, as arranged for washing by horse-power.

Figure 5 is a detail cross-section of the power-riddle, taken through the line $y\,y$, fig. 4.

Figure 6 represents a perspective view of the grinding-mill.

Figure 7 is a horizontal sectional view of the power riddle N and trough M.

Similar letters of reference indicate corresponding parts.

My invention has for its object to furnish a simple, convenient, and effective machine for separating the seed from the pulp of the *Bois-de-Arc* or Osage orange and other apples where the seed is required to be separated uninjured for planting and other purposes; and It consists in the construction and combination of the various parts of the apparatus, as hereinafter more fully described.

A are the foundation sills or frame of the grinding-mill, which are securely formed to each other, and to which, at the angles or corners, are securely framed the uprights or posts B.

The inner corners of the posts B are concaved, as shown in fig. 2, and each of said posts has a vertical row of teeth, C, about two inches long, attached to it.

The upper ends of the posts B are connected and supported by the frame or top sills D.

E is the grinding-cylinder, the lower journal of which revolves in the frame A, and the upper journal of which revolves in a semicircular notch in the inner edge of the plank F, attached to the top frame D, and covering about one-half of said frame, leaving the other half open to receive the hopper through which the fruit is introduced.

The upper journal of the cylinder E is kept in place by the semicircular band G, the ends of which are secured to the edge of the plank F.

The upper part of the cylinder E is made tapering, and said cylinder has nine spiral rows of teeth, H, attached to it, three of said rows extending its whole length, three about two thirds, and three about one-third of its length from its lower end. The teeth H are so arranged that as the cylinder is revolved they may pass through the spaces between the teeth C.

To the upper end of the upper journal of the cylinder E is attached the sweep I, by means of which the said cylinder is revolved.

In the spaces between the posts B are placed planks J, which are secured in place by buttons pivoted to the outer sides of the said posts B. The plank J, upon the opposite side from the hopper, is so arranged that it may be readily slid up and down to regulate the size of the discharge-orifice, so that the pomace may be ground coarser or finer, as may be desired.

K are arms, attached to and projecting laterally from the lower end of the cylinder D, and which are beveled or rounded off upon the forward sides of their projecting ends, as shown in figs. 1 and 2, to push the ground pomace out through the discharge-orifice, where it is received in some suitable receptacle from which it is transferred to the riddle by hand or otherwise, as may be desired.

L is the hand-riddle into which the pomace in introduced from the mill, and which is made with two bottoms.

The upper bottom, $e^1$, is perforated with numerous holes, of such a size as to allow the seeds and finer pomace to pass through.

The lower bottom, $e^2$, is made close, and its head end is inclined upward so as to be about upon a level with the upper or perforated bottom, $e^1$. The head end of the upper bottom also inclines upward and extends up to the upper edge of the riddle, a space being thus left above the edge of the lower bottom, $e^2$, for the water, seed, and fine pomace to flow out into the washing-trough.

To the sides of the riddle L are attached longitudinal cleats, $e^3$, which rest upon the edges of the washing-trough.

M is the trough in which the seeds are washed and separated from the fine pomace and gum.

The trough M is made with two bottoms, the upper bottom, $m^1$, being perforated with numerous holes of such a size as not to allow even the smallest seeds to pass through.

The space between the perforated bottom $m^1$ and the close bottom $m^2$ is open at the tail end of the trough, and is closed, when desired, with a small gate, $m^3$, pivoted at its center.

The tail end of the trough M is formed of a stationary cross-bar, $m^2$, and a number of removable cross-bars, $m^5$, placed the one above the other, and the ends of which enter vertical grooves in the sides of said trough.

In using the apparatus the pomace from the grinding-mill is introduced into the riddle L in connection with a continuous stream of water, and is stirred until the seeds and finer pomace have escaped into the trough M. The coarser pomace is then removed from the riddle, and another supply is introduced.

As the seeds, gum, and fine pomace flow into the trough M, from the tail end of which the movable cross-bars $m^5$ have been removed, the seeds and gum form a stratum upon the bottom $m^1$, while the fine pomace is carried out at the tail end of the trough by the stream of water. As the stratum reaches the top of the bar $m^2$ one of the movable bars $m^5$ is inserted, and so on until the trough M has become sufficiently full. The remainder of the bars $m^5$ are then inserted, the gate $m^3$ opened, and the entire mass thoroughly stirred until the seeds have been thoroughly washed, the gum, dirt, and remaining pomace flowing out through the space between the bottoms $m^1 m^2$. When the seeds are clean, the inflow of water is stopped and the seeds are allowed to drain, and are then taken to the dryers.

When the riddle is to be operated by horse-power, the power-riddle N is used, which is a trough $n^1$, secured to the head of the trough M, as shown in fig. 4. The outer end of the trough $n^1$ is left uncovered for the introduction of pomace.

The rest of the trough $n^1$ is covered with a cap, $n^2$, and in it revolves a cylinder, $n^3$, provided with the teeth $n^4$, which, as the said cylinder is revolved, pass between the stationary teeth $n^5$, attached to the sides of the trough $n^1$, so as to thoroughly stir the pomace and detach all the seed before the said pomace flows into the trough M.

To one end of the cylinder $n^3$ is attached a pulley to receive the rope or band, by means of which motion is communicated to said cylinder from the horse-power.

The pomace and stream of water may be introduced into the power-riddle N in the manner described with reference to the riddle L; or the stream of water may be introduced into the mill and the pomace and water be allowed to flow together through pipes or troughs into the said riddle N. In all cases a stream of water is introduced directly into the riddle, whatever kind of riddle be used.

Having thus described my invention,

I claim as new and desire to secure by Letters Patent—

1. The hand-riddle L $e^1 e^2 e^3$, constructed and operating, in connection with the trough M, substantially as herein shown and described, and for the purpose set forth.

2. The power-riddle N $n^1 n^2 n^3 n^4 n^5$, constructed and operating, in connection with the trough M, substantially as herein shown and described, and for the purpose set forth.

3. The trough M $m^1 m^2 m^3 m^4 m^5$, constructed and operating substantially as herein shown and described, and for the purpose set forth.

ROBT. H. MAYO.

Witnesses:
J. K. P. CAMPBELL,
C. B. BERRY.